Dec. 8, 1925.　　　　　　　　　　L. W. MILLER　　　　　　　　　1,565,184
INTERNAL COMBUSTION ENGINE
Filed Nov. 10, 1923　　　　5 Sheets-Sheet 1
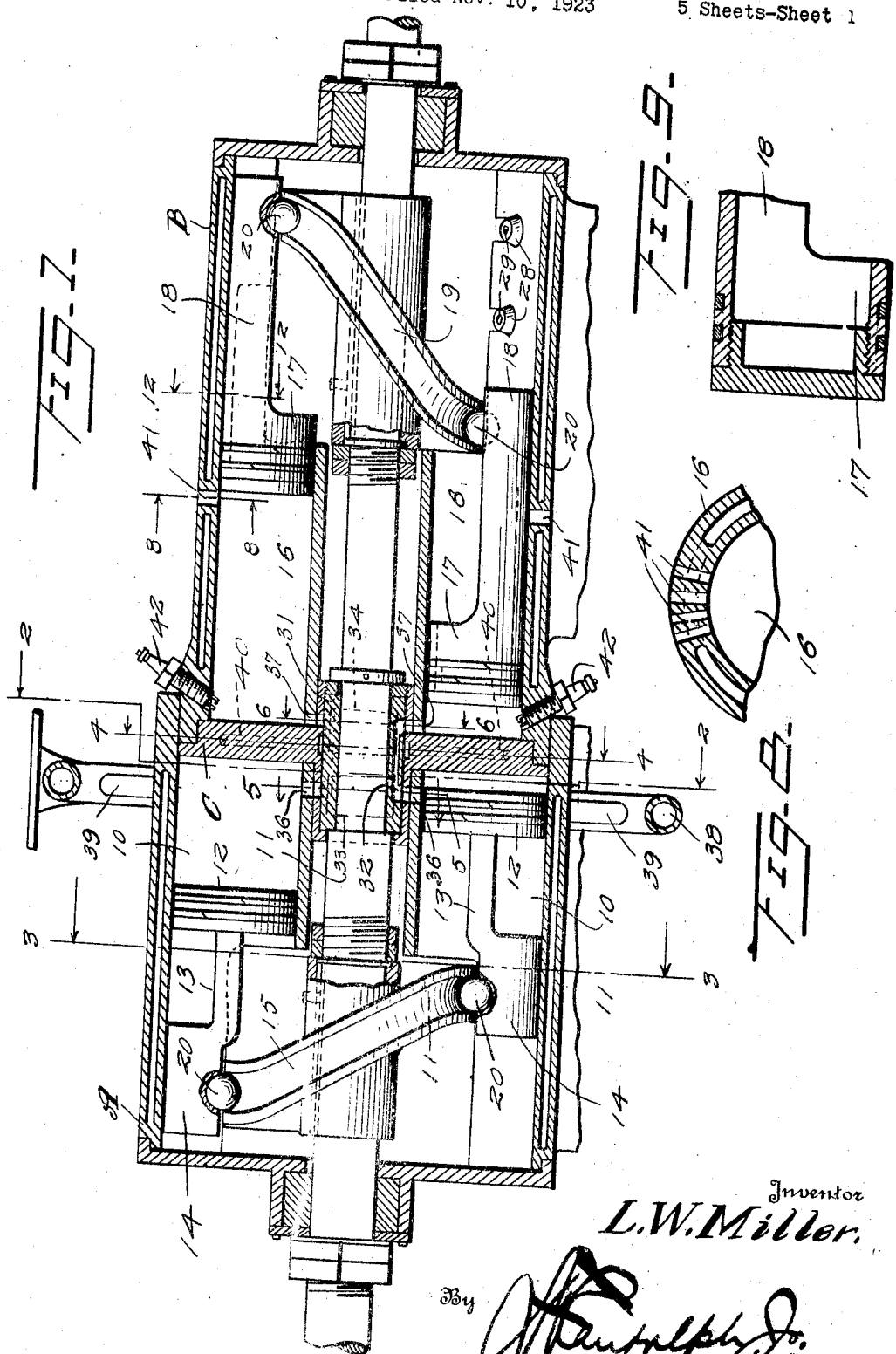
Inventor
L. W. Miller,
By
Attorney Dec. 8, 1925.  
L. W. MILLER  
INTERNAL COMBUSTION ENGINE  
Filed Nov. 10, 1923  
1,565,184  
5 Sheets-Sheet 2
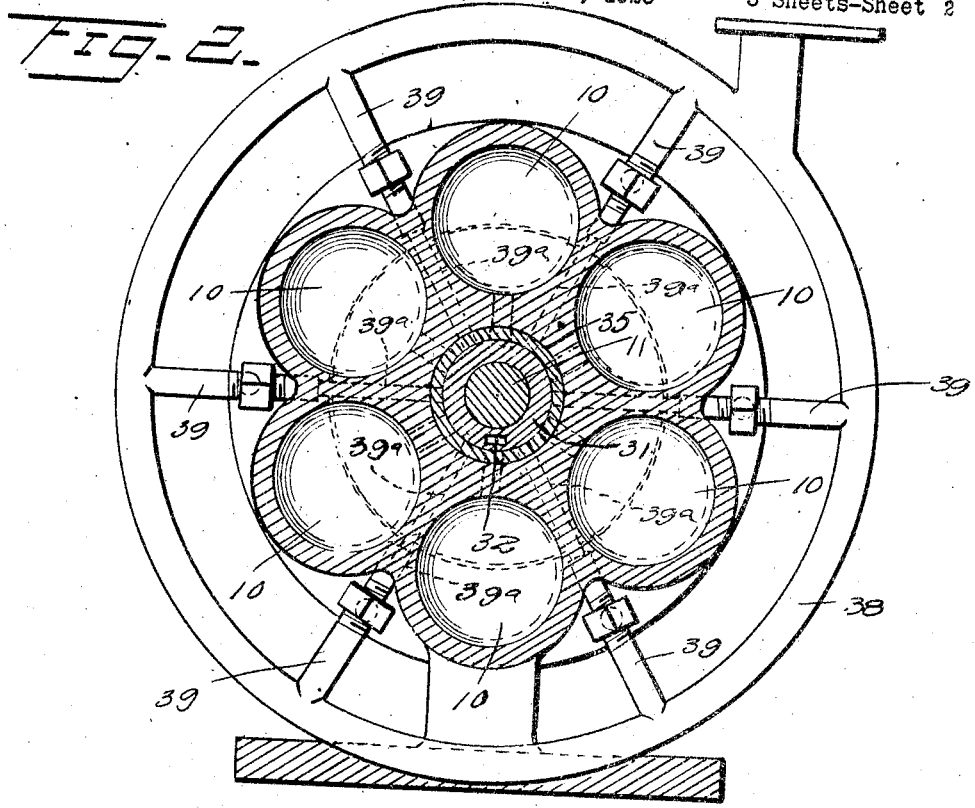
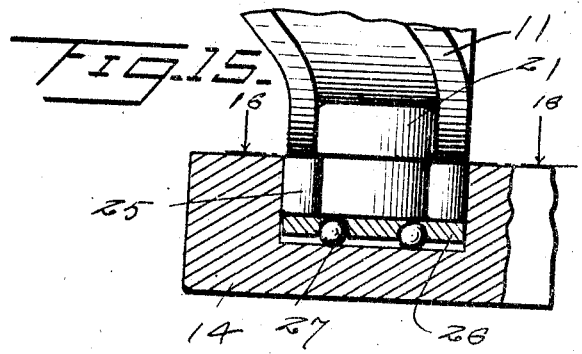
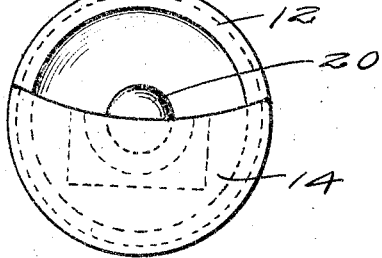
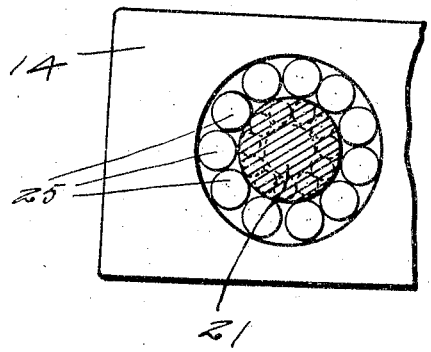
Inventor  
L. W. Miller.  
By  
Attorney Dec. 8, 1925.

L. W. MILLER 1,565,184

INTERNAL COMBUSTION ENGINE

Filed Nov. 10, 1923    5 Sheets-Sheet 3

Inventor
L. W. Miller.
By
Attorney

Dec. 8, 1925.
L. W. MILLER
1,565,184
INTERNAL COMBUSTION ENGINE
Filed Nov. 10, 1923   5 Sheets-Sheet 4
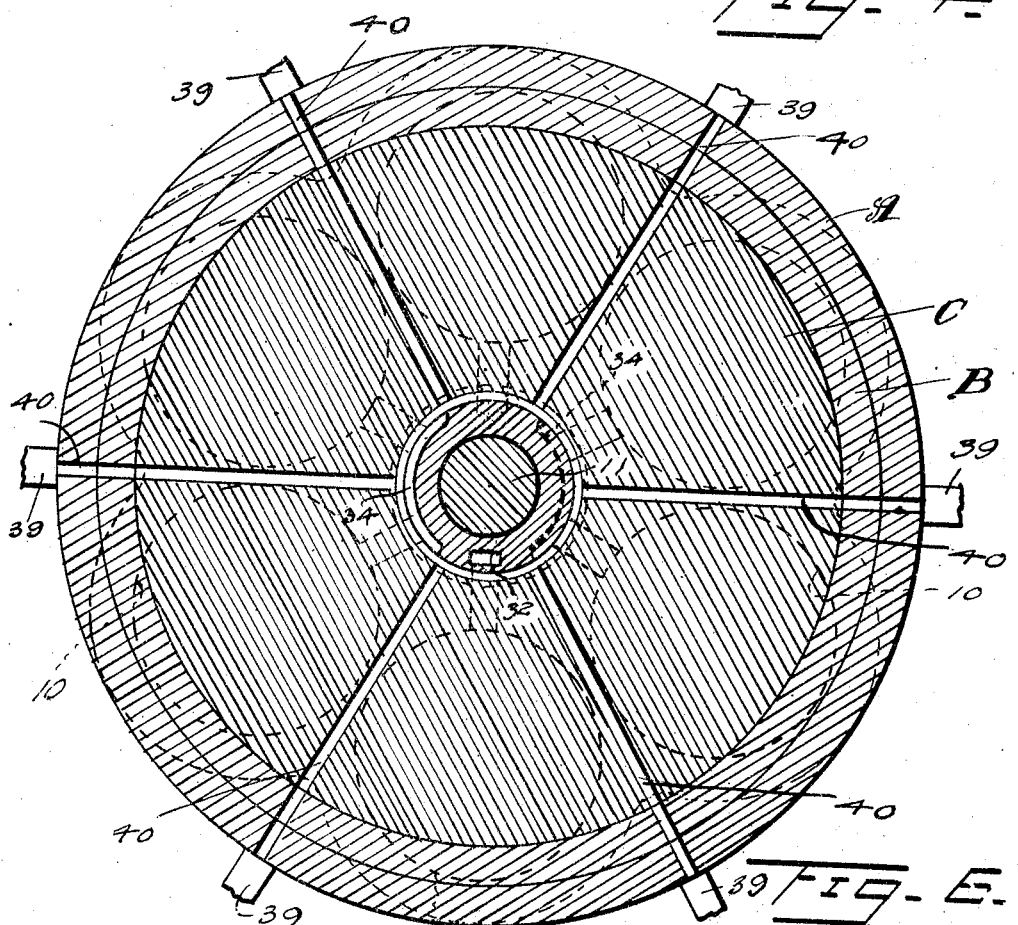
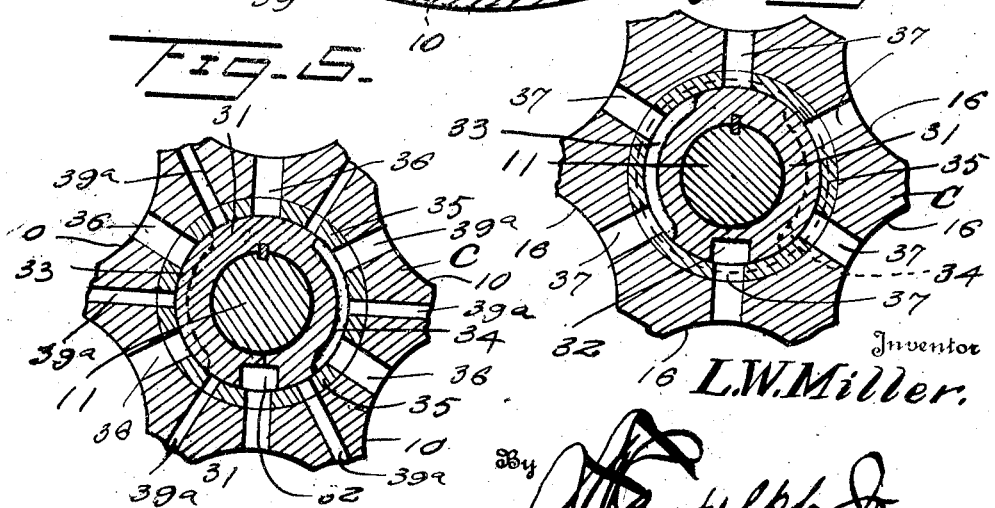

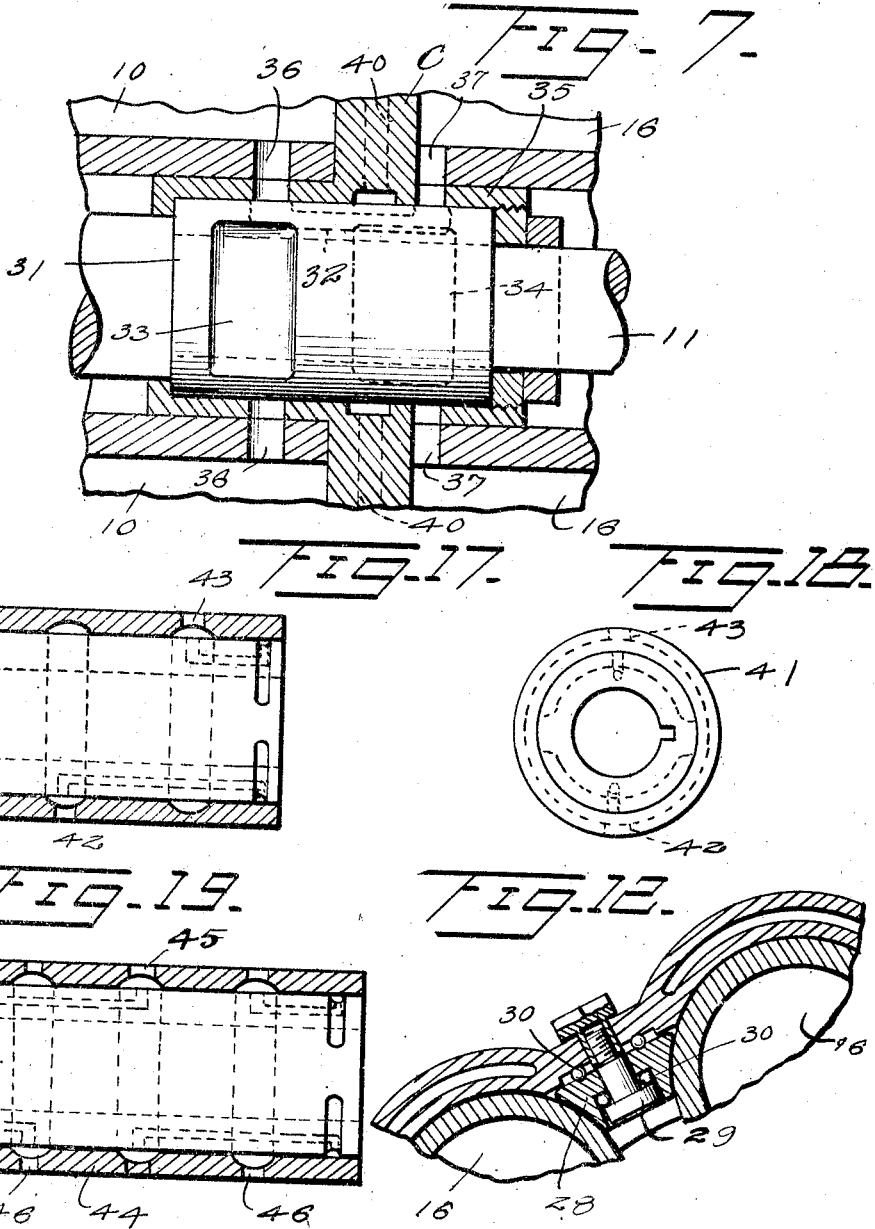

Patented Dec. 8, 1925.

1,565,184

UNITED STATES PATENT OFFICE.

LLOYD W. MILLER, OF BESSEMER, PENNSYLVANIA.

INTERNAL-COMBUSTION ENGINE.

Application filed November 10, 1923. Serial No. 674,038.

*To all whom it may concern:*

Be it known that I, LLOYD W. MILLER, a citizen of the United States, residing at Bessemer, in the county of Lawrence and State of Pennsylvania, have invented certain new and useful Improvements in Internal-Combustion Engines; and I do hereby declare the following to be a full, clear, and exact description of the invention, such as will enable others skilled in the art to which it appertains to make and use the same.

The object of the present invention is the provision of a motor wherein reciprocating motion is converted into rotary motion by means of a spiral or helical connection and which will admit of the conversion of rotary movement into a reciprocating movement.

The invention particularly aims to convert a reciprocating movement into a rotary movement and to provide an organization including a plurality of cylinders grouped about a shaft and pistons adapted to operate in the cylinders and having a spiral or helical connection with the rotary shaft.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 3:
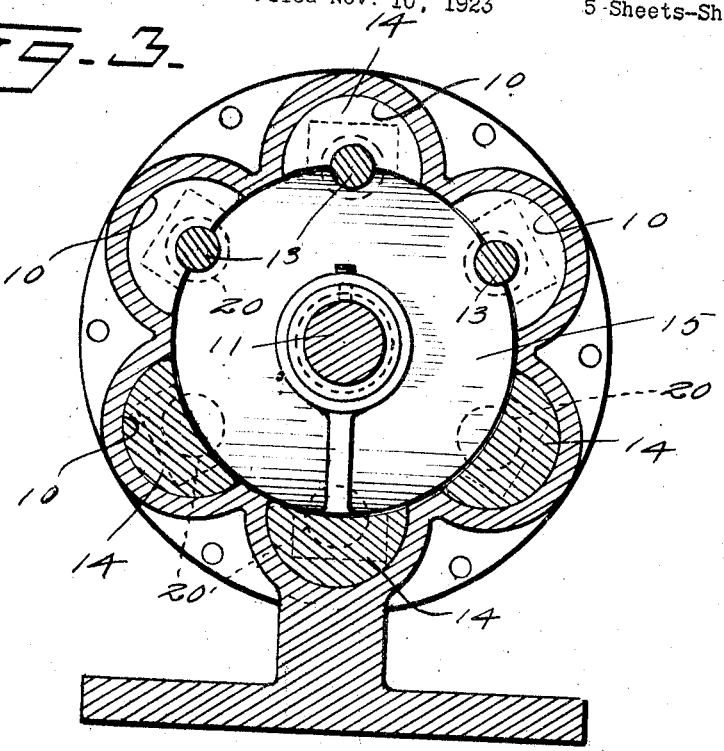
Figure 13:
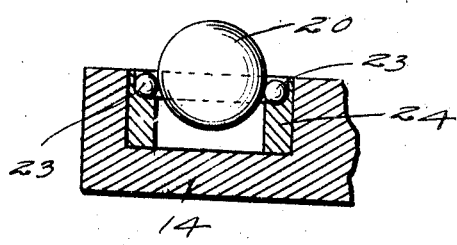
Figure 11:
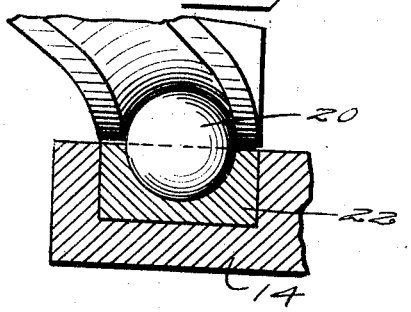
Figure 14:
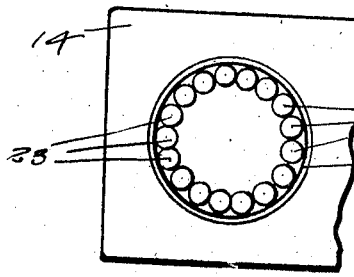

Referring to the accompanying drawings forming a part of the application:

Figure 1 is a vertical central longitudinal section of a motor embodying the invention, Figure 2 is a sectional view on the line 2—2 of Figure 1, looking in the direction of the arrows, Figure 3 is a sectional view on the line 3—3 of Figure 1, looking to the left as designated by the arrows, Figure 4 is a sectional view on the line 4—4 of Figure 1, showing the parts on a larger scale and having the outer portion of the manifold broken away, Figure 5 is a detail sectional view of the valve mechanism on the line 5—5 of Figure 1, Figure 6 is a detail sectional view of the valve mechanism on the line 6—6 of Figure 1, Figure 7 is a fragmentary sectional view showing more clearly the valve mechanism, Figure 8 is a detail sectional view of a portion of a working cylinder on the line 8—8 of Figure 1, Figure 9 is a detail sectional view of the working end of a piston, Figure 10 is an end view of a piston, Figure 11 is a detail sectional view on the line 11—11 of Figure 1, showing the parts on a larger scale, Figure 12 is a sectional view showing an antifriction bearing between adjacent cylinders, Figure 13 is a view similar to Figure 11 of a modification, Figure 14 is a top plan view of the parts shown in Figure 13, the connecting ball being omitted, Figure 15 is a view similar to Figure 11 of a further modification, Figure 16 is a sectional view on the line 16—16 of Figure 15, and Figures 17, 18 and 19 are detail views of a valve mechanism for a fluid medium such as steam or compressed air.

Corresponding and like parts are referred to in the following description and designated in the several views of the drawings by like reference characters.

The invention illustrated comprises two similar blocks A and B which are disposed in axial alinement and which are separated by a partition C, the block A being of slightly larger diameter than the block B. These blocks by reason of their function may be properly designated as the feed block A and the work block B, the feed block receiving and compressing the fuel and supplying the same to the work block in which the fuel is exploded and the burnt gases discharged into the atmosphere. The feed block A contains a plurality of cylinders 10 which are grouped about a shaft 11, as shown most clearly in Figure 2. A piston 12 is provided on each of the cylinders 10 and has a rod 13 which terminates in a lateral enlargement 14. A spiral or helical guide 15 is fast to the shaft 11 and the several pistons 12 have connection therewith through the enlargement 14. The connection between each of the lateral enlargements 14 and the spiral or helical guide 15 includes an antifriction bearing whereby to reduce the resistance and friction to the smallest amount possible.

The block B includes a plurality of cylinders 16 which are grouped about the shaft 11 and disposed in line with corresponding cylinders 10. A piston 17 is provided for each of the cylinders 16 and its rod 18 is connected with the shaft 11 in a similar manner to the pistons 12. A spiral or helical guide 19, fast to the shaft 11 and reversely disposed to the guide 15, has an antifriction connection with the rod of the piston 17. The stroke of the piston 12 is less than the stroke of the piston 17 and in consequence the inclination of the guide 15 is less than the inclination of the guide 19. Each of the guides 15 and 19 is grooved or channeled to receive the antifriction bearing which is partly seated in the groove or channel of the guide and a recess formed in the extension of the piston. This connection may consist of a ball 20, as shown most clearly in Figures 1, 11 and 13, or a roller 21, as illustrated in Figures 15 and 16. As shown most clearly in Figure 11, the ball 20 may be seated in a recess formed in a block 22 set into the extension of the piston. As illustrated in Figure 13, the ball 20 is supported upon a plurality of balls 23 mounted in a race formed in a ring 24 which is inserted in a recess in the extension of the piston. Figures 15 and 16 show the rollers 21 reduced at one end and surrounded by rollers 25 fitted in a recess formed in the extension of the piston, said rollers 25 and the roller 21 being supported upon a plate 26 which is mounted upon balls 27.

Referring to Figure 12 of the drawings, it is observed that roller bearings 28 are disposed in the partitions separating adjacent cylinders so as to minimize the friction between the pistons and cylinders and thereby prevent any waste of energy. Each of the rollers 28 is mounted upon a pin 29 and ball bearings 30 are interposed between the roller 28 and the pin 29 and the wall of the recess in which the roller 28 is fitted. It is observed that the roller 28 is common to adjacent cylinders.

A valve 31 is fast to the shaft 11 so as to rotate therewith and this valve is formed with a U-shaped passage 32 opening laterally therethrough upon opposite sides of the partition C and with cutaway portions 33 and 34 upon opposite sides and at opposite ends, whereby to provide intake and exhaust passages. A sleeve 35 snugly receives the valve 31 and forms a casing therefor and is fixed within the axial openings of the blocks A and B and the partition C. Corresponding openings 36 are formed in the walls of the valve casing 35 and cylinders 10 and constitute ports for the outflow of the compressed gas from the cylinders 10 to the cylinders 16. Corresponding openings 37 are formed in the valve casing 35 and the walls of each of the cylinders 16 and are adapted to register with the opening 32 to admit of the compressed charge of fuel passing from the cylinders 10 into the cylinders 16.

An annular intake manifold 38 encircles the engine block A and is connected with each of the cylinders 10 by means of radially disposed pipes 39 and ports 39$^a$ so as to supply fuel thereto from a suitable source in successive order, the admission of the fuel being controlled by means of the valve 31. Radially disposed exhaust openings 40 are formed in the partition C and open at their outer ends into the atmosphere and are adapted to communicate at their inner ends with the cylinders 16. The openings 40 constitute auxiliary exhaust ports. Openings 41 formed in the outer side of each of the cylinders constitute the main exhaust ports for relieving the cylinders 16 of the major part of the burnt gases when the pistons 17 are at the limit of their outer or forward stroke. Spark plugs 42 are provided at the inner ends of the cylinders 16 to ignite the gaseous mixture when the pistons 17 are at the predetermined point of their return stroke.

Figures 17 and 18 disclose a rotary valve 41 which is adapted to fit the drive shaft 11 loosely. The inlet 42 of this valve may be made of such a length so as to cut off the steam at any point in the length of the stroke of the piston so that the latter may be driven to the end of its stroke by expansion of the steam in a manner well understood. The exhaust 43 may be of sufficient length to allow complete exhaust of the spent steam. Figure 19 shows a double-acting valve 44 having a single exhaust 45 and two inlet ports 46.

It will be understood from the foregoing taken in connection with the accompanying drawings that the engine is adapted to convert a reciprocating motion into a rotary motion. The gaseous mixture from a suitable source of supply is admitted into each of the cylinders 10 in rotation from the inlet manifold 38, the same being controlled by means of the valve 31. On the outstroke of a piston 12 the fuel is drawn into the cylinder 10 and on the instroke of the piston 12, the fuel drawn into the cylinder 10 is compressed. As the piston 12 reaches the limit of its instroke, the valve 31 assumes a position to bring the port 32 in register with the ports 36 and 37 with the result that the compressed charge passes from the cylinder 10 into the cylinder 16. It is observed that the pistons 12 and 17 receive a synchronous inward and outward movement. As the compressed charge passes from the cylinder 10 into the cylinder 16, the piston 17 is reaching the limit of its instroke and at this time the valve 31 assumes a position to cut off communication between the two cylinders 10 and 16 and an instant thereafter the gaseous charge contained in the cylinder 16 is ignited and operates to move the piston 17 outward and as the latter reaches the limit of its outstroke, the exhaust 41 is uncovered and the burnt gases escape therethrough into the atmosphere. As the piston 17 begins its return stroke it closes the exhaust 41 and at this time the valve 31 assumes a position to connect the port 37 with the opening 40 through the passage 34, thereby scavenging the cylinder 16 upon the continued instroke of the piston 17. As the piston 17 reaches the end of its return stroke, the valve 31 assumes a position to cut off the auxiliary exhaust and reestablish communication between the cylinders 10 and 16, whereby the latter is again charged and the charge exploded in the manner indicated. The pistons receive a reciprocatory movement and by reason of the spiral or helical connection between the pistons and the shafts 11, the latter has a rotary movement imparted thereto.

What is claimed is:

1. In an engine of the character specified, oppositely disposed longitudinally alined cylinders, a partition separating the inner ends of the cylinders, pistons within the cylinders, a shaft at one side of the cylinders, a spiral or helical connection between the pistons and shaft whereby opposed pistons receive a simultaneous movement inwardly or outwardly, and a valve mechanism for controlling admission of a gaseous mixture into one of the cylinders during the outstroke of the piston therein and establishing communication between the two cylinders upon the instroke of the pistons therein whereby the compressed charge drawn into the first cylinder passes therefrom into the second cylinder to be exploded therein and drive the piston outwardly.

2. An engine of the character specified, comprising opposed longitudinally alined cylinders, a partition separating the cylinders and having an auxiliary exhaust therein, pistons within the cylinders, a spiral connection between the pistons and a shaft disposed at one side thereof, and a valve mechanism for controlling the supply of gaseous mixture to one of the cylinders upon the outstroke thereof and establishing communication between the two cylinders whereby the compressed charge from the first cylinder will pass into the second cylinder in which it is ignited, the last mentioned cylinder having an exhaust which is uncovered by the piston when reaching its outstroke and said valve mechanism establishing communication with the auxiliary exhaust whereby to scavenge the cylinder upon the return stroke of the piston.

3. An engine comprising a shaft, opposed longitudinally alined blocks receiving the shaft, each block having corresponding cylinders formed therein, the cylinders of one block being of larger diameter than the cylinders of the companion block, a partition separating the cylinders and having auxiliary exhaust ports therein, an intake manifold having connection with the inner ends of the larger cylinders, pistons within the cylinders, a spiral connection between the pistons and shaft, and a valve mechanism operable with the shaft and adapted to control the intake and exhaust, the gaseous mixture being drawn into the larger cylinders and compressed therein and delivered therefrom to the smaller cylinders in which combustion takes place and from which the burnt gases are scavenged.

4. An engine of the character described having a compression chamber and a firing chamber substantially in alinement, a partition between said chambers, a rotatable shaft outwardly of said chambers, spiral driving connections between said pistons and said shaft, and valve means under control of said shaft to permit passage of compressed fuel from the compression chamber past said partition to the firing chamber.

5. An engine of the character described having a compressing chamber and a firing chamber substantially in alinement, a partition between said chambers, a rotatable shaft outwardly of said chambers, spiral driving connections between said pistons and said shaft, and valve means under control of said shaft to permit passage of compressed fuel from the compression chamber past said partition to the firing chamber, means to supply fuel to the compression chamber, the firing chamber having an exhaust passage through its wall, and said partition having a passage constituting an auxiliary exhaust for the firing chamber.

6. An engine of the class described having walls therein providing compression chambers and firing chambers, said walls terminating short of the end walls of the engine, pistons movable in said chambers, spirally grooved members, a shaft carrying said members and journaled centrally with respect to said chambers, the pistons having means extending therefrom and engaged in the spiral grooves of said members, a partition between the compression chambers and firing chambers, said walls having ports on opposite sides of said partition, a valve carried by said shaft having passages therethrough whereby compressed fuel may pass through the same and said ports from the compression chambers to the firing chambers.

7. An engine of the class described having walls therein providing compression chambers and firing chambers, said walls terminating short of the end walls of the engine, pistons movable in said chambers, spirally grooved members, a shaft carrying said members and journaled centrally with respect to said chambers, the pistons having means extending therefrom and engaged in the spiral grooves of said members, a partition between the compression chambers and firing chambers, said walls having ports on opposite sides of said partition, a valve carried by said shaft having passages therethrough whereby compressed fuel may pass through the same and said ports from the compression chambers to the firing chambers, the engine having exhaust passages leading from the firing chambers, and passages in said partition serving as auxiliary exhaust outlets.

In testimony whereof I affix my signature.

LLOYD W. MILLER.